United States Patent
Kain et al.

(10) Patent No.: US 11,848,430 B2
(45) Date of Patent: Dec. 19, 2023

(54) SUPPLY CIRCUITS FOR BATTERY MANAGEMENT CIRCUITS

(71) Applicant: Infineon Technologies AG, Neubiberg (DE)

(72) Inventors: Clemens Kain, Kammern (AT); Mario Fuchs, Graz (AT)

(73) Assignee: Infineon Technologies AG, Neubiberg (DE)

( * ) Notice: Subject to any disclaimer, the term of this patent is extended or adjusted under 35 U.S.C. 154(b) by 305 days.

(21) Appl. No.: 17/148,470

(22) Filed: Jan. 13, 2021

(65) Prior Publication Data

US 2022/0223929 A1 Jul. 14, 2022

(51) Int. Cl.
*H01M 10/48* (2006.01)
*H01M 10/42* (2006.01)

(52) U.S. Cl.
CPC ....... *H01M 10/482* (2013.01); *H01M 10/425* (2013.01); *H01M 2010/4271* (2013.01)

(58) Field of Classification Search
CPC ............ H01M 10/425; H01M 10/482; H01M 2010/4271
See application file for complete search history.

(56) References Cited

U.S. PATENT DOCUMENTS

2012/0119705 A1* 5/2012 Eberhard ............... H02J 7/0016
320/135

OTHER PUBLICATIONS

Texas Instruments, "SafeTI™ Precision Monitor With Integrated Hardware Protector for Automotive Battery Pack Applications," BQ79606A-Q1, Apr. 2019, 269 pp.
Analog Devices, "12-Cell Battery Stack Monitors," LTC6811-1/LTC6811-2, Rev. C, 2016, (Applicant points out, in accordance with MPEP 609.04(a), that the year of publication, 2016, is sufficiently earlier than the effective U.S. filing date, so that the particular month of publication is not in issue.) 92 pp.
Analog Devices, "18-Cell Battery Stack Monitor with Daisy Chain Interface," LTC6813-1, Nov. 2020, 90 pp.
Maxim Integrated, "12-Channel High-Voltage Data Acquisition System," MAX17823B, Rev. 5, Sep. 2019, 121 pp.
Maxim Integrated, "12-Channel High-Voltage Smart Sensor Data-Acquisition Interface," MAX17843, Rev. 2, Apr. 2018, 131 pp.
NXP, "Battery cell controller IC," MC33771B_SDS, Rev. 6.0, Jun. 22, 2020, 29 pp.
NXP, "MC33772 and MC33664 Battery Cell Controller and Transformer Physical Layer," MC33772FSA4, 2015, (Applicant points out, in accordance with MPEP 609.04(a), that the year of publication, 2015, is sufficiently earlier than the effective U.S. filing date, so that the particular month of publication is not in issue.) 3 pp.

(Continued)

*Primary Examiner* — Brittany L Raymond
(74) *Attorney, Agent, or Firm* — Shumaker & Sieffert, P.A.

(57) ABSTRACT

A battery management circuit may be configured to monitor a plurality of battery cells. The battery management circuit may comprise a battery monitoring circuit, and a supply circuit configured to supply the battery monitoring circuit based on the plurality of battery cells. The supply circuit may comprise a DC/DC power converter and a regulator, and wherein the DC/DC power converter is configurable based on a number of monitored battery cells in the plurality of battery cells.

12 Claims, 7 Drawing Sheets

(56) References Cited

OTHER PUBLICATIONS

Panasonic, "Battery Monitoring IC for Industry," AN49503A, Jun. 28, 2017, 146 pp.
ST, "Automotive chip for battery management applications," L9963, DB4045, Rev 1, Oct. 2019, 11 pp.

\* cited by examiner

SUPPLY CIRCUITS FOR BATTERY MANAGEMENT CIRCUITS

TECHNICAL FIELD

This disclosure relates to battery management circuits, and more specifically, to supply circuits configured to supply battery monitoring circuits in a battery management system (BMS).

BACKGROUND

Battery powered devices, such as electric vehicles, often include many battery cells connected in series to form a battery system for the battery powered device. For such battery systems, battery management systems (BMSs) are often used for battery cell monitoring, thermal monitoring, block balancing of different sets of battery cells, or other battery management functions.

BMSs often use several different battery monitoring circuits in order to monitor all of the battery cells of a battery powered device. For example, each of the battery monitoring circuits may monitor a subset of the battery cells of a battery system that is used to provide power to a battery powered device. Battery monitoring circuits may be capable of monitoring several cells using different analog-to-digital converters or using multiplexing techniques. The number of channels for each battery monitoring circuit, however, may be limited, and therefore, several battery monitoring circuits may be needed within a BMS in order to monitor all of the cells of a battery system.

For example, an electrical vehicle may include a battery system with one hundred or more battery cells connected in series, but battery monitoring circuits may include a more limited number of channels, e.g., only twelve channels. In this case, nine battery monitoring circuits may be needed within a BMS to monitor all one hundred cells of the battery system. As a result, in some cases, some of the battery monitoring circuits may monitor fewer battery cells than the number of available channels in the battery monitoring circuits, which can lead to challenges in supply matching of the supply current used to power the battery monitoring circuits.

SUMMARY

In general, this disclosure is directed to techniques and circuits for controlling the supply (e.g., current or voltage) to a battery monitoring circuit that monitors battery cells. In particular, this disclosure describes circuits that implement a DC/DC power converter as part of a supply circuit for monitoring battery cells. The battery cells themselves may provide input power to the supply circuit, and the DC/DC power converter may be configured to account for the number of battery cells that are being monitored. In addition, the DC/DC power converter may be further configured to account for other factors, such as a factor that defines a minimum number of battery cells that are being monitored within a battery management system (BMS) and/or a factor that accounts for manufacturing variations during integrated circuit production. In this way, a supply circuit may be adaptable or configurable to promote balanced power supply to battery monitoring circuits in different situations that may have different numbers of battery cells.

In one example, this disclosure describes a battery management circuit configured to monitor a plurality of battery cells. The battery management circuit may comprise a battery monitoring circuit and a supply circuit configured to supply the battery monitoring circuit based on the plurality of battery cells. Moreover, according to this disclosure, the supply circuit may comprise a DC/DC power converter and a regulator, and wherein the DC/DC power converter is configurable based on a number of monitored battery cells in the plurality of battery cells.

In another example, this disclosure describes a method that comprises supplying a battery monitoring circuit using a supply circuit and a plurality of battery cells of a battery system, wherein the supply circuit comprises a DC/DC power converter and a regulator, and controlling the DC/DC power converter according to a configurable parameter that is configurable based on a number of monitored battery cells in the plurality of battery cells.

In still another examples, this disclosure describes a battery management system (BMS) configured to monitor a plurality of battery cells arranged in series. The BMS may comprise a first battery monitoring circuit configured to monitor a first subset of the plurality of battery cells, and a second battery monitoring circuit configured to monitor a second subset of the plurality of battery cells, wherein the second subset is different than the first subset and wherein the second subset includes a different number of battery cells than the first subset. The BMS may further comprise a first supply circuit configured to supply the first battery monitoring circuit based on the first subset of the plurality of battery cells, and a second supply circuit configured to supply the second battery monitoring circuit based on the second subset of the plurality of battery cells, wherein the first and second supply circuits are configured to define substantially similar supplies to the first battery monitoring circuit and to the second battery monitoring circuit. The first and second supply circuits may comprise DC/DC power converters that are structurally similar to one another, but the DC/DC power converters of the first and second supply circuits may be configured with different so-called K-factors. The K-factors may tune the DC/DC power converters for different numbers of battery cells in the first subset and the second subset. In addition, in some examples, the K-factors may also account for a minimum number of battery cells that are being monitored within the BMS. Moreover, in some examples, the K-factors may further account for manufacturing variations during integrated circuit production.

Details of these and other examples are set forth in the accompanying drawings and the description below. Other features, objects, and advantages will be apparent from the description and drawings, and from the claims.

DETAILED DESCRIPTION

This disclosure is directed to techniques for controlling the supply (e.g., current or voltage) to a battery monitoring circuit that monitors battery cells. In particular, this disclosure describes circuits that implement a DC/DC power converter as part of a supply circuit for monitoring battery cells. The battery cells themselves may provide input power to the supply circuit, and the DC/DC power converter of the supply circuit may be configured to account for the number of battery cells that are being monitored. In addition, the DC/DC power converter may be further configured to account for other factors, such as a factor that defines a minimum number of battery cells that are being monitored within a battery management system (BMS) and/or a factor that accounts for manufacturing variations during an integrated circuit production process.

In some examples, this disclosure contemplates a supply circuit comprising a DC/DC power converter that includes a customer configurable k-factor that defines a ratio between the input current or voltage and the output current or voltage. In addition to the DC/DC power converter, the supply circuit may also include a regulator, such as a linear regulator (LDO) to achieve lower power dissipation and better supply matching across the whole battery management system (BMS).

The k-factor of the DC/DC power converter for any given use of the supply circuit may be tunable based on the number of battery cells that are being monitored. For example, the k-factor may be different for a situation where the supply circuit is supplying a battery monitoring circuit that monitors eight battery cells, relative to a situation where the supply circuit is supplying a battery monitoring circuit that monitors eleven battery cells. In addition, the k-factor of the DC/DC power converter may be further configured to account for other circuit factors, such as a factor that defines a minimum number of battery cells that are being used within a larger BMS, and/or a factor that accounts for manufacturing variations during an integrated circuit production process. In this way, a supply current or supply voltage can be better tuned for different battery monitoring situations, such as situations where different numbers of battery cells are being monitored.

An electrical vehicle, for example, may include a battery system with one hundred or more battery cells connected in series, but battery monitoring circuits may include a more limited number of channels, e.g., only twelve channels. In this case, nine battery monitoring circuits may be needed within a BMS to monitor all one hundred cells of the battery system. The circuits and techniques of this disclosure may help improve the power supplied to the battery monitoring circuits in such situations, accounting for the different number of used channels by different battery monitoring circuits.

Figure 1:
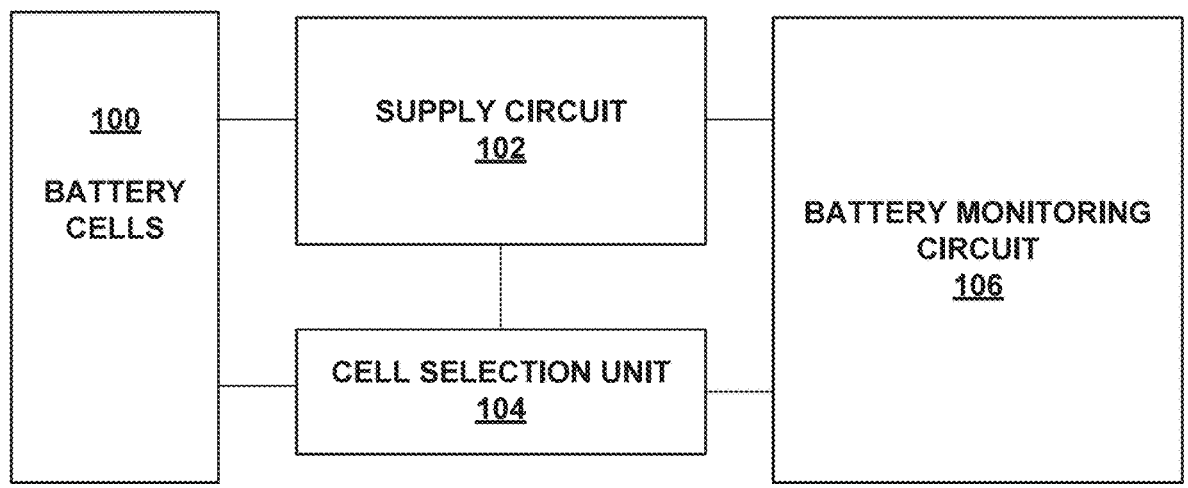
FIG. 1 is a block diagram showing battery cells and a battery monitoring system (BMS) that includes a supply circuit and a battery monitoring circuit.

FIG. 1 is a block diagram showing battery cells and a battery management system (BMS) that includes a supply circuit 102 and a battery monitoring circuit 106 used to monitor battery cells 100. Battery cells 100 may comprise a set of battery cells connected in series. In order to monitor battery cells, supply circuit 102 uses power from battery cells to supply power to cell selection unit 104 and battery monitoring circuit. Cell selection unit 104 individually connects each cell within battery cells 100 to battery monitoring circuit 106 so that battery monitoring circuit 106 can monitor each cell, such as by measuring or tracking the potential energy stored in each cell. For example, cell selection unit 104 may comprise circuit elements that form a multiplexer or other type of selection circuit that can individually connect each cell within battery cells 100 to battery monitoring circuit 106.

According to this disclosure, supply circuit 102 may be configured to supply battery monitoring circuit 106 with current or voltage that is defined (at least in part) based on the number of battery cells within battery cells 100. More specifically, supply circuit 102 may comprise a DC/DC power converter and a regulator, such as an LDO regulator. The DC/DC power converter of supply circuit 102 is configurable based on a number of monitored battery cells in the plurality of battery cells, e.g., the number of cells within battery cells 100. Thus, the DC/DC power converter may be configured differently, for example, in a situation where battery cells 100 include nine battery cells relative to a situation where battery cells 100 include twelve battery cells.

According to this disclosure, the DC/DC power converter within supply circuit 102 may be configurable to define a ratio of input to output of the DC/DC power converter, which may be a ratio of input to output current or a ratio of input to output voltage. The ratio may be defined by a configurable parameter that is based on the number of monitored battery cells. Accordingly, a customer may be able to tune the configurable parameter to different situations that make use of different numbers of monitored battery cells. In some cases, the configurable parameter may be based on the number of monitored battery cells being monitored and also based on a minimum number of battery cells that are being monitored and supplied by other circuits within the larger BMS.

In some cases, the DC/DC power converter may be configurable on the basis of multiple factors. For example, the DC/DC power converter may be configurable based on a first K factor that is defined based on the number of monitored battery cells and based on a minimum number of battery cells are being monitored within a given BMS. Moreover, the DC/DC power converter may be further configurable based on a second K factor that is defined during production testing of the battery management circuit to tune the DC/DC power converter. The first K factor may be defined at least in part by the customer, depending on the use case, and the second K factor may be defined by an integrated circuit manufacturer in order to help to compensate for operational changes of the battery management circuit caused by thermal variations or other manufacturing factors or variations. The customer may select the actual number of monitored battery cells for a given use case and the customer may select the minimum number of battery cells that are being monitored within the BMS. In this way, the customer may configure supply circuit 102 by defining the first K factor of the DC/DC power converter within supply circuit 102 based on the number of monitored battery cells for a given use case and based on the minimum number of battery cells in any given block of cells within the BMS.

In addition to improving the supply, in some cases, supply circuit 102 may be further configured to stimulate the plurality of cells (at one or more desired frequencies) while the battery monitoring circuit monitors the cells, which may help ensure accurate cell monitoring and responsiveness and may be helpful for impedance measurements. Also, in some examples, supply circuit 102 may be further configured to perform charge balancing of battery cells 100 relative to other sets or blocks of cells, e.g., drawing down more or less charge from battery cells 100 to balance the charge relative to one or more other sets of cells, which may be desirable. Using supply circuit 102 for charge balancing of battery cells 100, for example, may reduce or eliminate charge balancing functions that are otherwise performed by battery monitoring circuit 106 or another circuit.

As mentioned, in many situations, the number of battery cells in the system may be larger than the number of monitoring channels of a battery monitoring circuit. Accordingly, in many cases, several battery monitoring circuits may be used within a larger BMS. The supply circuits of this disclosure may be used for each of the battery monitoring circuits within a larger BMS, in which case each battery monitoring circuit may monitor a different subset of the battery cells within a larger battery system. The K factors described herein may allow the supply circuit to be tuned based on the number of cells associated with that supply circuit and based on a minimum number of cells within any block of cells of the BMS.

Figure 2:
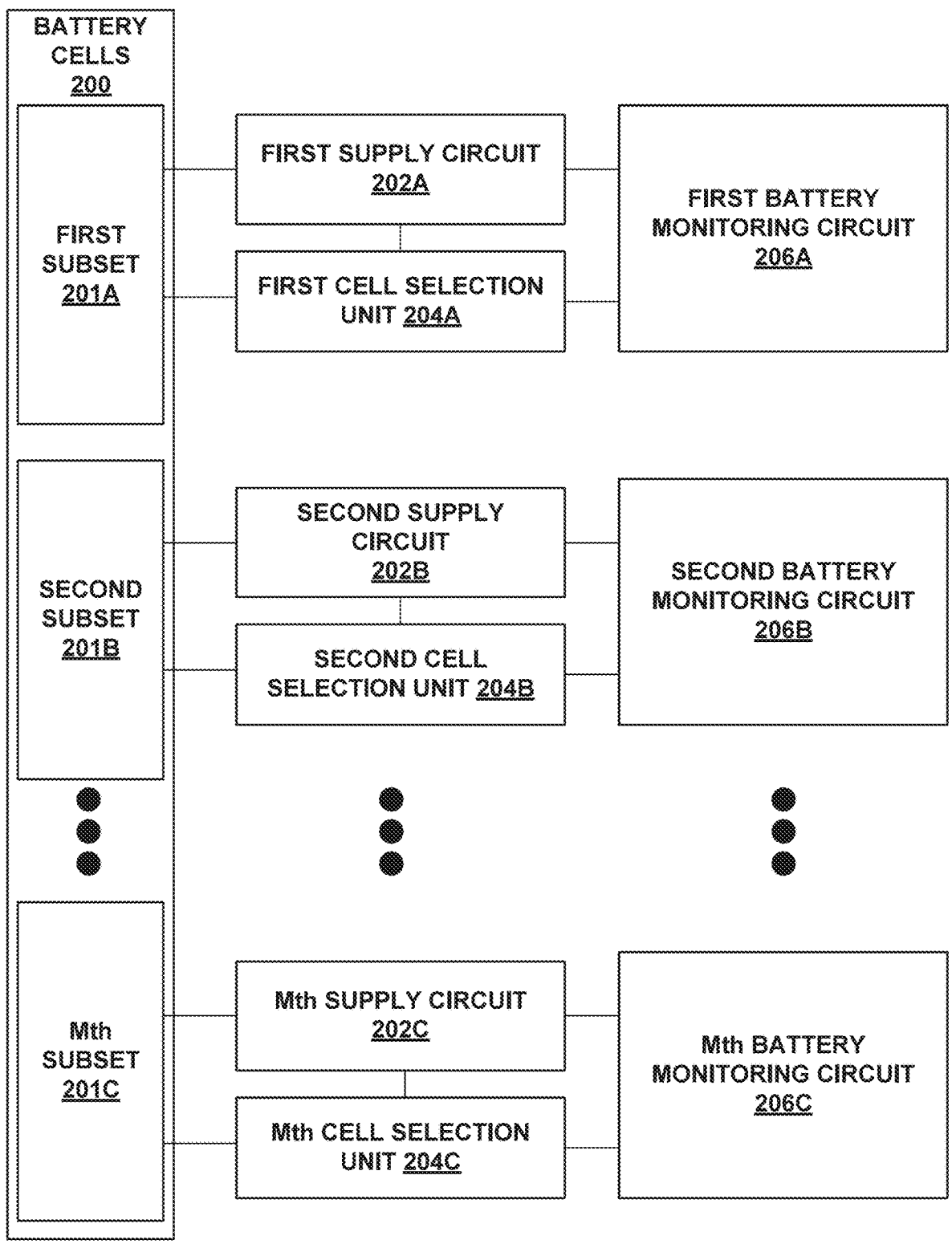
FIG. 2 is a block diagram showing battery cells and a BMS that includes several battery monitoring circuits and several supply circuits.

FIG. 2 is a block diagram showing battery cells and a BMS that includes several battery monitoring circuits and several supply circuits. In particular, battery cells 200 may include a first subset 201A of battery cells, a second subset 201B of battery cells, and an Mth subset 201C of battery cells. In FIG. 2, "M" may represent any positive integer such that the cells 200 may include any number of cells that may be divided into any number of different subsets. The different subsets may have different numbers of battery cells, although one or more of the subsets may have the same or a similar number of battery cells. For each of the subsets 201A, 201B, 201C of battery cells, a cell selection unit 204A, 204B, 204C may individually connect each cell within a respective subset to a respective battery monitoring circuit 206A, 206B, 206C.

The techniques of this disclosure may improve the supply to battery monitoring circuits 206A, 206B, 206C by implementing supply circuits 202A, 202B, 202C that are configured for the different subsets 201A, 201B, 201C being monitored. In FIG. 2, battery monitoring circuits 206A, 206B, 206C are collectively referred to as battery monitoring circuits 206, supply circuits 202A, 202B, 202C are collectively referred to as supply circuits 202, cell selection units 204A, 204B, 204C are collectively referred to as cell selection units 204, and different subsets 201A, 201B, 201C are collectively referred to as subsets 201. Supply circuits 202, cell selection units 204 and battery monitoring circuits 206 may form a larger BMS for monitoring all of battery cells 200.

Battery cells 200 may represent a plurality of battery cells arranged in series. Supply circuits 202, cell selection units 204 and battery monitoring circuits 206 may define a BMS that is configured to monitor all of cells 200. In particular, as shown, a first battery monitoring circuit 206 may be configured to monitor a first subset 201A of the plurality of battery cells 200, and a second battery monitoring circuit 206B may be configured to monitor a second subset 201B of the plurality of battery cells 200, and in some cases, the second subset is different than the first subset and the second subset includes a different number of battery cells than the first subset. In this case, supply circuit 202A may be configured differently than supply circuit 202B in order to account for the different number of cells being monitored (and the different number that ultimately define the input current or voltage to supply circuits 202A and 202B).

For example, first supply circuit 202A may be configured to supply first battery monitoring circuit 206A based on the first subset 201A of the plurality of battery cells 200, and a second supply circuit 202B may be configured to supply second battery monitoring circuit 206B based on second subset 201B of the plurality of battery cells 200, wherein the first and second supply circuits 202A and 202B are configured to define substantially similar supplies to first battery monitoring circuit 206A and to second battery monitoring circuit 206B.

As discussed in greater detail below, supply circuits 202A, 202B, 202C may each include a DC/DC converter that is configurable based on one or more factors. One factor that may be used to configure the DC/DC converter of supply circuits 202A, 202B, 202C is the number of cells within each subset 201A, 201B, 201C. The ratio of input to output current or voltage of the DC/DC converter may be configurable based on the number of cells within each subset 201A, 201B, 201C. Additional factors may also be used to configure the DC/DC converter of supply circuits 202A, 202B, 202C, such as factor that defines a minimum number of channels that are used in the different subsets 201, and a factor that adjusts the DC/DC converter to compensate for manufacturing variations.

In some examples, first and second supply circuits 202A and 202B may each comprise a DC/DC power converter and a regulator, wherein each of the DC/DC power converters is configurable based on a number of battery cells being monitored respectively by the first and second battery monitoring circuits 206A and 206B (e.g., based on the number of cells in first subset 201A and the number of cells in second subset 201B). In some examples, each of the DC/DC power converters within supply circuits 202A and 202B may be configurable to define a respective ratio of input to output (current or voltage), wherein for each of the DC/DC power converters, the respective ratio is defined by a configurable parameter that is based on the number of monitored battery cells and based on a minimum number of battery cells that are being within different subsets 201 of the BMS shown in FIG. 2.

As additional features, it may also be desirable for supply circuits to stimulate battery cells while performing cell monitoring. Thus in some examples, first supply circuit 202A is configured to stimulate first subset 201A of the plurality of cells 200 while first battery monitoring circuit 206A monitors the first subset 201A, the second supply circuit is configured to stimulate the second subset 201B of the plurality of cells 200 while second battery monitoring circuit 206B monitors the second subset 201B.

Also, it may desirable for supply circuits 202 to perform charge balancing of different blocks of cells. Since the cells are already used to power the supply circuits, in some cases, some charge balancing may be performed as part of the functionality of supply circuits 202. Accordingly, in some cases, first supply circuit 202A may be configured to perform charge balancing of first subset 201A of battery cells relative to second subset 201B of battery cells, and second supply circuit 202B may be configured to perform charge balancing of second subset 201B of battery cells relative to first subset 201A of battery cells. In other words, charge balancing of different subsets 201 relative to other subsets 201 can be performed by the supply circuits 202, which may be desirable.

Figure 3:
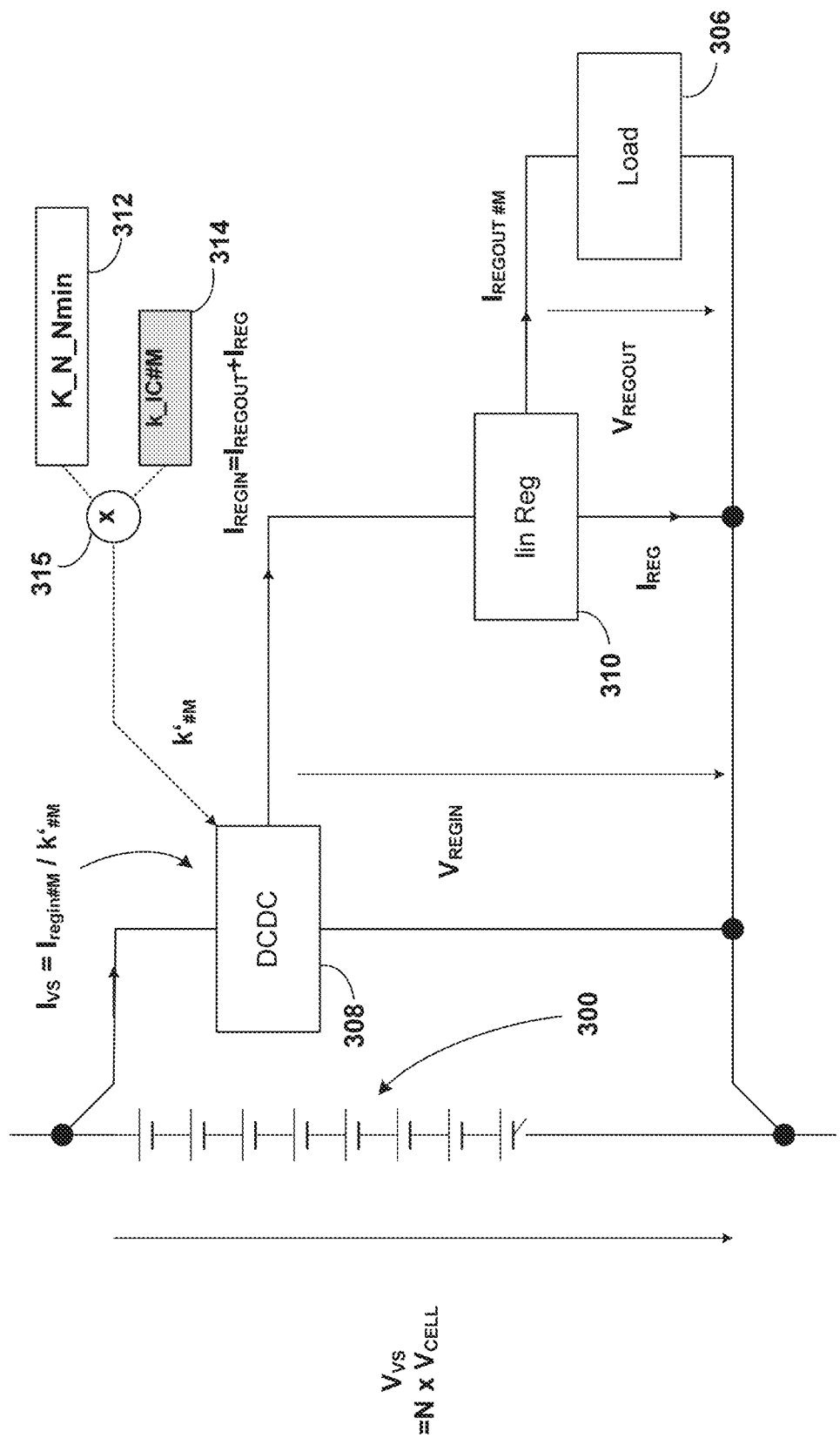
FIG. 3 is a block diagram showing an example supply circuit that may be coupled to battery cells and to a load.

FIG. 3 is a block diagram showing an example supply circuit that may be coupled to battery cells and to a load. Battery cells 300 may comprise a set of cells (in this example, eight cells), or may comprise a sub-set of cells associated with a larger battery system. Load 306 may comprise a battery monitoring circuit that is supplied by the other elements shown in FIG. 3. A cell selection unit (not shown in FIG. 3) may allow individual cells within battery cells 300 to be individually connected to load 306 to perform cell monitoring functions.

As shown in FIG. 3, a supply circuit for load 306 may comprise a DC/DC power converter 308 and a linear regulator 310. Moreover, DC/DC power converter 308 is configurable. A first K factor 312 may define at least part of the input to output ratio DC/DC power converter 308 based on the number (N) of cells in plurality of cells 300 (in this example, N=8 since there are eight cells) and based on a minimum number of cells (Nmin) that are being used within a BMS (e.g., four cells, eight cells, or some other defined minimum that is set by the user for a given situation). A second K factor 314 may be defined during production testing of the circuit to tune the DC/DC power converter 308 so as to account for manufacturing variations, thermal variations between any use case, or other factors that may affect circuit operation. Element 315 functionally illustrates the combination of first K factor 312 and second K factor 314 to define a combined K factor (e.g., K'#M) that defines the input to output ratio of DC/DC converter 308 based on information defined by first K factor 312 and second K factor 314. In this way, DC/DC power converter 308 can be tuned for the use case where circuit M is used to provide supply to a battery monitoring circuit (e.g., load 306) for monitoring of eight cells within plurality of cells 300.

In some examples, first K factor 312 is defined based on variables N and Nmin shown in FIG. 3, and the second K factor may be defined at least in part by the variable M. N may define the number of cells attached to the circuit, which in this case may be 8. Nmin may define the minimum number of cells connected to any corresponding circuit within a larger BMS. In some cases, M is merely an identifier of the particular circuit, in which case, M may identify or define manufacturing variations of an integrated circuit fabrication process associated with that particular circuit. Also, in some cases, the value M may also identify the total number of supply circuits (and the corresponding number of subsets of blocks of cells) within the BMS (similar to how M is labeled in FIG. 2). Thus, in some cases, the K factors used in any given supply circuit may be further defined based on the number total of supply circuits that are being used (which may also correspond to the total number of blocks of cells or subsets of cells used within the BMS).

Some example labels of voltage and current are also shown in FIG. 3. $V_{VS}$ refers to the voltage associated with cells 300, which may correspond to the number of cells (N) within cells 300 multiplied by the voltage associated with one cell ($V_{CELL}$). $I_{VS}$ refers to a current within DC/DC converter 308 that comprises an input current $I_{regin\#M}$ adjusted by the combined K factor (e.g., $K'_{\#M}$) that defines the input to output ratio of DC/DC converter based on information defined by first K factor 312 and second K factor 314. $V_{REGIN}$ refers to a regulated input voltage across linear regulator 310 and $V_{REGOUT}$ refers to a regulated output voltage across load 306. $I_{REG}$ refers to a regulated current from linear regulator 310 and $I_{REGOUT\#M}$ refers to a regulated current from linear regulator 310 that is supplied to load 306. In some examples, the circuits of this disclosure may properly control and define $I_{REGOUT\#M}$ for a given situation that accounts for the number of battery cells in cells 300 and possibly other factors discussed herein.

Figure 4:
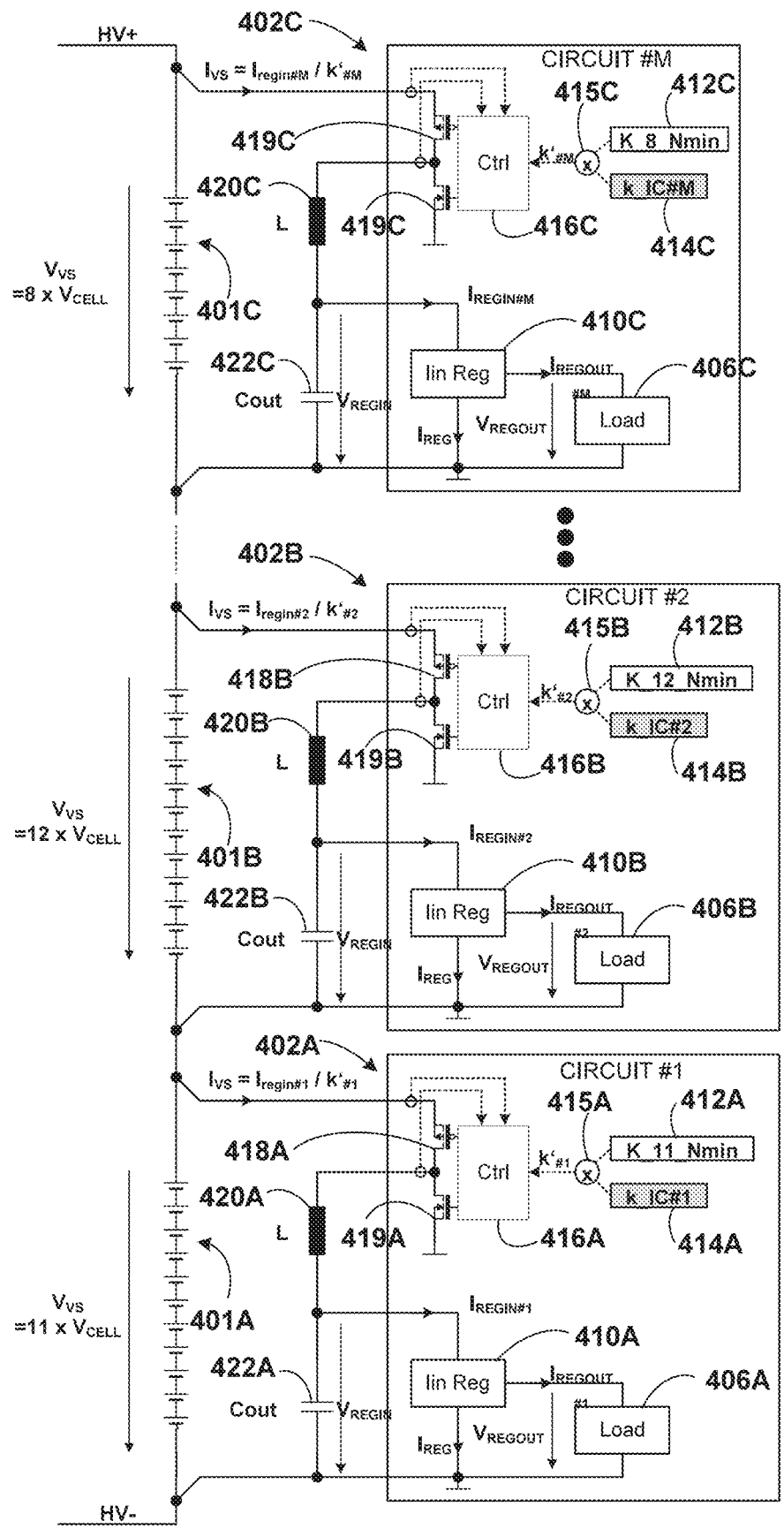
FIG. 4 is a block diagram showing an example that includes several supply circuits that may be coupled to different sets of battery cells and to different loads.

FIG. 4 is a block diagram showing an example that includes several supply circuits that may be coupled to different sets of battery cells and to different loads. Battery cells of an entire battery system may comprise several sub-set of cells associated with a larger battery system. In this example, three subsets of battery cells are shown, subset 401A, subset 401B and subset 401C (collectively subsets 401). Moreover, one or more of subsets 401 may have different numbers of battery cells than other subsets. For example, in FIG. 4, subset 401A includes eleven battery cells, subset 401B includes twelve battery cells, and subset 401C includes eight battery cells. The techniques of this disclosure may improve power supply in these types of situations whereby a similar supply circuit can be used for each situation and a DC/DC converter can be configured with different K factors to help balance the supply for these different situations.

Loads 406A, 406B, 406C (collectively loads 406) may comprise battery monitoring circuits that is supplied by the other elements shown in FIG. 4. A cell selection unit (not shown in FIG. 4) may allow individual cells within subsets 401 of battery cells to be individually connected to loads 406 in order to perform cell monitoring functions.

As shown in FIG. 4, the supply circuits for loads 406 may each comprise a DC/DC power converter and a regulator, which may comprise a linear regulator. Various components of the DC/DC power converters are illustrated in FIG. 4 and discussed in detail below. Linear regulators are labeled as elements 410A, 410B, 410C (collectively linear regulators 410).

According to FIG. 4, a first circuit 402A may comprise a first DC/DC power converter that includes transistors 418A, 419A, controller 416A that controls on/off states of transistors 418A, 419A to deliver pulsed signals to inductor 420A and output capacitor 422A. The timing of the on/off switching of transistors 418A, 419A may be controlled via controller 416A according to a timing scheme, and the timing scheme may be based at least in part on one or more configurable parameters. In particular, controller 416A may perform the control based on one or more programmable factors that define the input to output ratio of the DC/DC power converter. A first K factor 412A may define at least part of the input to output ratio of the DC/DC power converter of circuit 402A based on the number of cells in subset 401A (in this example, eleven cells) and based on a minimum number of cells (Nmin) that are used in any block within the BMS. The number of cells used and the minimum number of cells (Nmin) may be programmable values selected by a user in any given use case. In the example of FIG. 4, Nmin may be equal to eight (8) since this is the minimum number of cells within any of the subsets 401 being supplied and monitored by circuits 402. A second K factor 414A may be defined during production testing of the circuit to tune the DC/DC power converter so as to account for manufacturing variations, thermal variations between any use case, or other factors that may affect circuit operation. Also, as noted above, in some cases, the second K factor may also tune the DC/DC converter based on the total number of supply circuits in the BMS (which corresponds to the number of subsets 401). Element 415A functionally illustrates the combination of first K factor 412A and second K factor 414A to define a combined K factor (e.g., $K'_{\#1}$) that defines the input to output ratio of the DC/DC converter based on information defined by first K factor 412A and second K factor 414A. In this way, DC/DC power converter of circuit 402A can be tuned for the use case where circuit 402A is used to provide supply to a battery monitoring circuit (e.g., load 406A) for monitoring of eleven battery cells.

According to FIG. 4, a second circuit 402B may comprise a second DC/DC power converter that includes transistors 418B, 419B, controller 416B that controls on/off states of transistors 418B, 419B to deliver pulsed signals to inductor 420B and output capacitor 422B. The timing of the on/off switching of transistors 418B, 419B may be controlled via controller 416B according to a timing scheme, and the timing scheme may be based at least in part on one or more configurable parameters. In particular, controller 416B may perform the control based on one or more programmable factors that define the input to output ratio of the DC/DC power converter. A first K factor 412B may define at least part of the input to output ratio of the DC/DC power converter of circuit 402B based on the number of cells in subset 401B (in this example, twelve cells) and based on a minimum number of cells (Nmin) that are associated with any of subsets of cells 401. Again, in this case, Nmin may be equal to eight (8) since this is the minimum number of cells within any of the subsets 401 being supplied and monitored by circuits 402. A second K factor 414B may be defined during production testing of the circuit to tune the DC/DC power converter so as to account for manufacturing variations, thermal variations between any use case, or other factors that may affect circuit operation. Element 415B functionally illustrates the combination of first K factor 412B and second K factor 414B to define a combined K factor (e.g., K'#2) that defines the input to output ratio of the DC/DC converter of circuit 402B based on information defined by first K factor 412B and second K factor 414B. In this way, DC/DC power converter of circuit 402B can be tuned for the use case where circuit 2 is used to provide supply to a battery monitoring circuit (e.g., load 406B) for monitoring of twelve battery cells.

Any number of circuits may be used in a larger BMS according to this disclosure. FIG. 4 shows three circuits, but additional circuits may be needed to monitor additional battery cells. Similar to the explanations above, according to FIG. 4, a third circuit 402C may comprise a third DC/DC power converter that includes transistors 418C, 419C, controller 416C that controls on/off states of transistors 418C, 419C to deliver pulsed signals to inductor 420C and output capacitor 422C. The timing of the on/off switching of transistors 418C, 419C may be controlled via controller 416C according to a timing scheme, and the timing scheme may be based at least in part on one or more configurable parameters. In particular, controller 416C may perform the control based on one or more programmable factors that define the input to output ratio of the DC/DC power converter. A first K factor 412C may define at least part of the input to output ratio of the DC/DC power converter of circuit 402C based on the number of cells in subset 401C (in this example, eight cells) and based on a minimum number of cells that are associated with subsets of cells 401. In the example of FIG. 4, Nmin may be equal to eight (8) since this is the minimum number of cells within any of the subsets 401 being supplied and monitored by circuits 402. A second K factor 414C may be defined during production testing of the circuit to tune the DC/DC power converter so as to account for manufacturing variations, thermal variations between any use case, or other factors that may affect circuit operation. Element 415C functionally illustrates the combination of first K factor 412C and second K factor 414C to define a combined K factor (e.g., K'$_{\#M}$) that defines the input to output ratio of the DC/DC converter of circuit 402C based on information defined by first K factor 412C and second K factor 414C. In this way, DC/DC power converter of circuit 402C can be tuned for the use case where circuit M is used to provide supply to a battery monitoring circuit (e.g., load 406C) for monitoring of eight battery cells.

The label "M" in FIG. 4 generally corresponds to any positive integer, meaning that any number of circuits could be used in a larger BMS to monitor any number of subsets or blocks of cells. HV− and HV+ refer to the negative and positive terminals of a larger battery system that includes each of subsets 401 of battery cells. Some example labels of voltage and current are also shown in FIG. 4. $V_{VS}$ refers to the voltage associated with each subset 401 of cells, which may correspond to the number of cells (N) within each subset 401 multiplied by the voltage associated with one cell ($V_{CELL}$). $I_{VS}$ refers to a current within each DC/DC converter that comprises an input current $I_{regin\#M}$, $I_{regin\#2}$ or $I_{regin\#1}$ adjusted by the combined K factor (e.g., K'$_{\#M}$, K'$_{\#2}$, or K'$_{\#1}$) that defines the input to output ratio of DC/DC converter based on information defined by first K factor 412A, 412B, 412C and second K factor 414A, 414B, 414C. $V_{REGIN}$ refers to a regulated input voltage across linear regulator 410A, 410B, 410C and $V_{REGOUT}$ refers to a regulated output voltage across load 406A, 406B, 406C. $I_{REG}$ refers to the supply current of the linear regulator 410A, 410B, 410C, and $I_{REGOUT}$ refers to a regulated current from linear regulator 410A, 410B, 410C that supplies the load 406A, 406B, 406C. In some examples, the circuits of this disclosure may properly control and define $I_{REGOUT}$ differently for different situations so as to account for the number of battery cells in each subset 401 and possibly other factors discussed herein. Although similar labels are used for current and voltage shown in the different circuits 402 of FIG. 4, the actual values of these currents and voltages would typically be different for each of circuits 402 because of the different K factors used in the different DC/DC converters of each of circuits 402.

Figure 5:
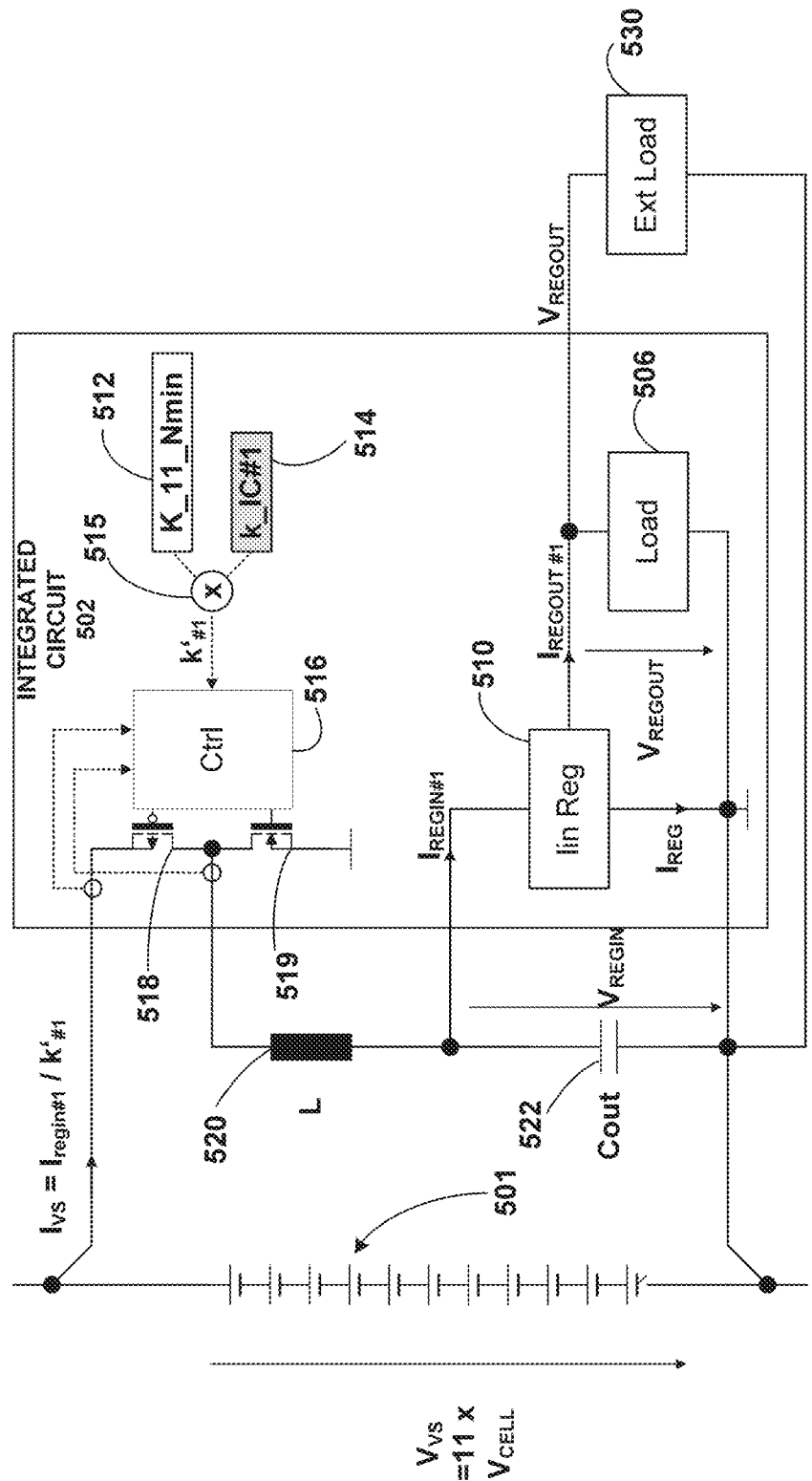
FIGS. 5 and 6 are block diagrams showing example supply circuits that may be coupled to battery cells and to a load.

FIG. 5 is a block diagram showing an example supply circuit that may be coupled to battery cells 501 and to a load 506. As described in greater detail below, the techniques of this disclosure may allow for supply of an external load 530 in addition to load 506, which may represent a battery monitoring circuit. As shown in FIG. 5 a circuit may comprise an integrated circuit 502 and addition external circuit elements (e.g., capacitor 522 and inductor 520) that operate with integrated circuit 502 to define a DC/DC power converter. Similar to other examples above, transistors 518, 519 are controlled by controller 516. In particular, controller 516 controls on/off states of transistors 518, 519 to deliver pulsed signals to inductor 520 and output capacitor 522. The timing of the on/off switching of transistors 518, 519 may be controlled via controller 516 according to a timing scheme, and the timing scheme may be based at least in part on one or more configurable parameters. In particular, controller 516 may perform the control based on one or more programmable factors that define the input to output ratio of the DC/DC power converter. A first K factor 512 may define at least part of the input to output ratio of the DC/DC power converter of the circuit based on the number of cells being monitored (in this example, eleven cells) and based on a minimum number (Nmin) being monitored within a larger BMS. A second K factor 514 may be defined during production testing of the circuit to tune the DC/DC power converter so as to account for manufacturing variations, thermal variations between any use case, or other factors that may affect circuit operation. Element 515 functionally illustrates the combination of first K factor 512 and second K factor 514 to define a combined K factor (e.g., K'$_{\#1}$) that defines the input to output ratio of the DC/DC converter based on information defined by first K factor 512 and second K factor 514. In this way, DC/DC power converter of the circuit can be tuned for the use case where the circuit is used to provide supply to a battery monitoring circuit (e.g., load 506) for monitoring of eleven battery cells.

Also shown in the example of FIG. 5 is an external load 530 which is a load that is different than load 506. External load 530 may comprise an additional load that can be supplied by the circuits described herein. The power dissipation inside the circuit and at the linear regulator may be reduced as the Vregin voltage is reduced. This reduction in power dissipation resulting from the supply techniques of this disclosure may allow for other possibilities to increase the current consumption of additional external circuits which may be supplied by the internal linear voltage regulator (Vregout). Thus, in some examples, the supply circuits of this disclosure may allow for use with an external load 530, in addition to the monitoring circuit represented by load 506. Indeed, by reducing power dissipation within the circuit, the ability of supply circuit to supply an external load 530 is improved. The other current and voltage labels shown in FIG. 5 are generally similar to those described above with regard to FIGS. 3 and 4, although the actual current and voltage values may be different due to different configurations of the DC/DC converters.

Figure 6:
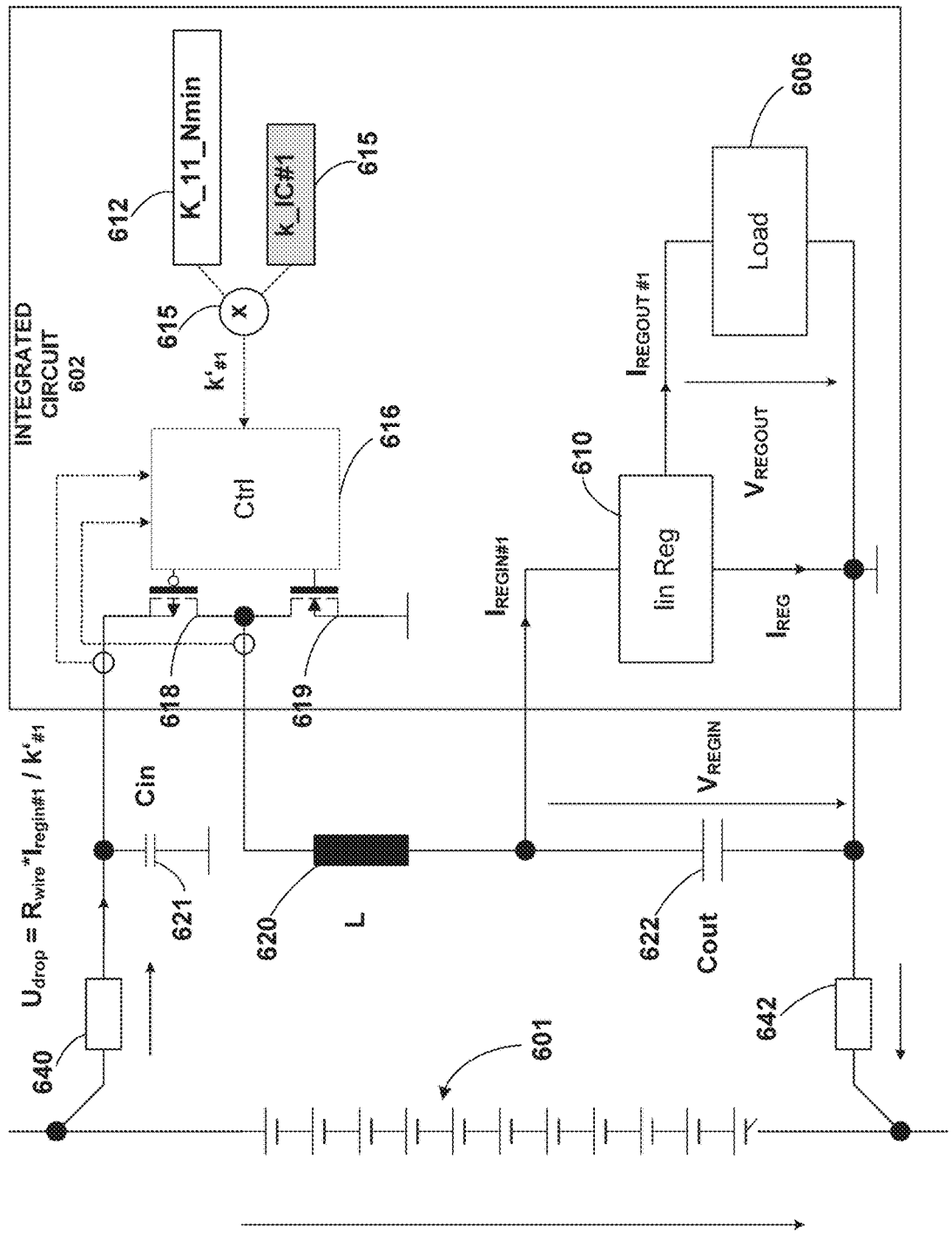

FIG. 6 is another block diagram showing example supply circuits that may be coupled to battery cells 601 and to a load 606. As described in greater detail below, the techniques and circuits of this disclosure may allow the supply circuit to perform other functions to battery cells 601, such as cell stimulation and/or cell block balancing.

As shown in FIG. 6, a circuit may comprise an integrated circuit 602 and addition external circuit elements (e.g., capacitors 621, 622 and inductor 620) that operate with integrated circuit 602 to define a DC/DC power converter. Transistors 618, 619 are controlled by controller 616. In particular, controller 616 may control on/off states of transistors 618, 619 to deliver pulsed signals to inductor 620 and output capacitor 622. The timing of the on/off switching of transistors 618, 619 may be controlled via controller 616 according to a timing scheme, and the timing scheme may be based at least in part on one or more configurable parameters. According to the techniques of this disclosure, controller 616 may perform the control based on one or more programmable factors that define the input to output ratio of the DC/DC power converter. A first K factor 612 may define at least part of the input to output ratio of the DC/DC power converter of the circuit based on the number of cells being monitored (in this example, eleven cells) and based on a minimum number of cells that are being monitored within a larger BMS. A second K factor 614 may be defined during production testing of the circuit to tune the DC/DC power converter so as to account for manufacturing variations, thermal variations between any use case, or other factors that may affect circuit operation. Element 615 functionally illustrates the combination of first K factor 612 and second K factor 614 to define a combined K factor (e.g., $k'_{\#1}$) that defines the input to output ratio of the DC/DC converter based on information defined by first K factor 612 and second K factor 614. In this way, DC/DC power converter of the circuit can be tuned for the use case where the circuit is used to provide supply to a battery monitoring circuit (e.g., load 606) for monitoring of eleven battery cells.

Also shown in the example of FIG. 6 is an input resistor 640 and an output resistor 642, which may comprise resistive circuit elements or possibly parasitic resistance in the electrical connections. For example, an input resistance 640 may cause a voltage drop in a given cell as $U_{drop} = R_{wire} * I_{regin\#1}/k'_{\#1}$, where $R_{wire}$ is the input resistance associated by element 640 (which may represent parasitic resistance of a wire or other electrical connection). $I_{regin\#1}$ and $k'_{\#1}$ are labeled in FIG. 6 and generally correspond to a regulated current and the combined K factor, as described herein. Thus, in this example, defining the K factor may affect $U_{drop}$, which in turn may be used to achieve cell balancing of battery cells 601 relative to other blocks of cells within a larger BMS. Moreover, input and output connections to each of battery cells 601, e.g. through input resistor 640 and output resistor 642, can achieve voltage drops or voltage increases in battery cells 601 to draw down charge or to increase charge. Input capacitor 621 and output capacitor 622 may operate as charge accumulation devices when performing such cell blocks balancing functions.

Thus, in some examples, the supply circuits of this disclosure may allow for use to achieve charge balancing between different blocks of battery cells (e.g., between battery cells 601 relative to another block of battery cells), in addition to supplying the monitoring circuit represented by load 606. Indeed, by performing cell balancing via the circuit shown in FIG. 6, other cell block balancing functions that may otherwise be performed by load 606 can be reduced or possibly eliminated. Also, in some example, stimulation signals can be sent through output resister 642 to stimulate one or more cells 601 while load 606 is performing cell monitoring. Stimulation may occur at one or more frequencies, and may be useful when load 606 is performing impedance measurements on a given cell.

The circuits described herein may achieve reduced current consumption (defined by K-factor) compared to a linear regulator, and the described circuits may also reduce the voltage drop and therefore prevent systematic incorrect voltage measurements performed by integrated circuit 602. In some examples, this voltage drop may be reduced by a factor of 2 or greater with the described circuits compared to a circuit that only includes a linear regular.

Table 1 shows some example ratios that may be defined by K-factors for a high voltage battery system, where a battery monitoring circuit is configured to monitor 4, 8, 12 & 18 cells per circuit. In Table 1 and Table 2, commas are used to represent decimal points.

TABLE 1

| Vregin_min [V] | Vcell_min [V] | Vcell_max [V] | Cells to Monitor | I_Vregin [A] | VS_min [V] | Vs_max [V] |
|---|---|---|---|---|---|---|
| 5 | 1.75 | 4.4 | 4 | 0.0112 | 7 | 17.6 |
|   |   |   | 8 | 0.0156 | 14 | 35.2 |
|   |   |   | 12 | 0.02 | 21 | 52.8 |
|   |   |   | 18 | 0.0266 | 31.5 | 79.2 |

| Ratio = k_X_N_min [1] | Vregin_min [V] | Vregin_max [V] | i_VS [A] | Pv_max [W] | Pv_max_old [W] |
|---|---|---|---|---|---|
| 1.40 | 5.00 | 12.57 | 0.00800 | 0.141 | 0.197 |
| 1.95 | 7.18 | 18.05 | 0.00800 | 0.282 | 0.549 |
| 2.50 | 8.40 | 21.12 | 0.00800 | 0.422 | 1.056 |
| 3.33 | 9.47 | 23.82 | 0.00800 | 0.634 | 2.107 |

Table 2 shows some example ratios that may be defined by K-factors for a high voltage battery system, where a battery monitoring circuit is configured to monitor. For a different system where only 12 and 18 cells are monitored the factors might be higher and the overall discharge current becomes lower.

TABLE 2

| Vregin_min [V] | Vcell_min [V] | Vcell_max [V] | Cells to Monitor | I_Vregin [A] | VS_min [V] | VS_max [V] |
|---|---|---|---|---|---|---|
| 5 | 1.75 | 4.4 | 12 | 0.02 | 21 | 52.8 |
|  |  |  | 18 | 0.0266 | 31.5 | 79.2 |

| Ratio = k_X_N_min [1] | Vregin_min [V] | Vregin_max [V] | i_VS [A] | Pv_max [W] | Pv_max_old [W] |
|---|---|---|---|---|---|
| 4.20 | 5.00 | 12.57 | 0.00476 | 0.251 | 1.056 |
| 5.59 | 5.64 | 14.18 | 0.00476 | 0.377 | 2.107 |

The desired ratio of input to output of the DC/DC converter of a supply circuit may be defined by the K factor. Again, this may include a first K factor that defines a minimum number of channels being used in a BMS, and the actual number of channels being used for each supply circuit of the BMS. The user may define the actual number of channels and the minimum number of channels uses for a given situation, and this may also be programmed by the user into the circuit (in the programmable memory). In addition, the overall K factor may also depend on a second K factor, which may comprise a value determined during production testing of the circuit. In some examples, the second K factor may be permanently stored in circuit in order to compensate for mismatch of the current consumption $I_{reginX}$. The second K factor may also be a function of temperature to compensate for temperature characteristics of the current consumption. The various elements labeled in the figures as representing K factors may also represent programmable memory that stores the K factors in the circuits.

The techniques of this disclosure may provide several advantages. Substantially equal current consumption of all cells may be achieved even with variation of the number of monitored cells per circuit within a larger battery system. Overall power dissipation needed to monitor the battery cells may be reduced, and power dissipation each circuit (e.g., at the linear regulator) is reduced as the Vregin voltage is reduced. As noted, above, this offers the possibility to increase the current consumption of additional external circuits which may be supplied by the internal linear voltage regulator (Vregout), such as explained with reference to FIG. 5.

Moreover, the voltage drop caused by the wire between the battery cell and the BMS pin may be reduced (smaller I_Vs), and therefore, the highest cell (e.g., a cell that shares a VS net to measure the cell voltage) and lowest cell (e.g., a cell that shares a GND net to measure cell voltage) in the system are less affected by errors, if the individual cell voltages are measured. Also, if the block voltage is measured for a block of cells, systemic errors in this block voltage measurement may be reduced.

As explained with reference to FIG. 6, cell block balancing is also possible in the system by adaption of the K_X_N min factor. Furthermore, the described circuits further offer the possibility to modulate the current of the attached cells. This can provide a desirable way to stimulate the cells with a certain (even very low) frequency during the cell monitoring. Such stimulation may be needed to measure the impedance of the attached battery cells. The circuit may perform modulation (square-wave, sine wave, or other modulation at one or more frequencies) of the K-factor with a certain frequency f stim. When performing this modulation, simultaneous current and voltage measurement the impedance of the cells at this frequency can be measured by the circuit.

The DC/DC implementations described herein are merely examples. There are various other DC/DC-structures that could also be used consistent with this disclosure. The DC/DC power converter of this disclosure may achieve a stable conversion ratio between input current and output current. Also, switched capacitor DC/DC could be used, but with more restrictions regarding adaption of the conversion factors.

Figure 7:
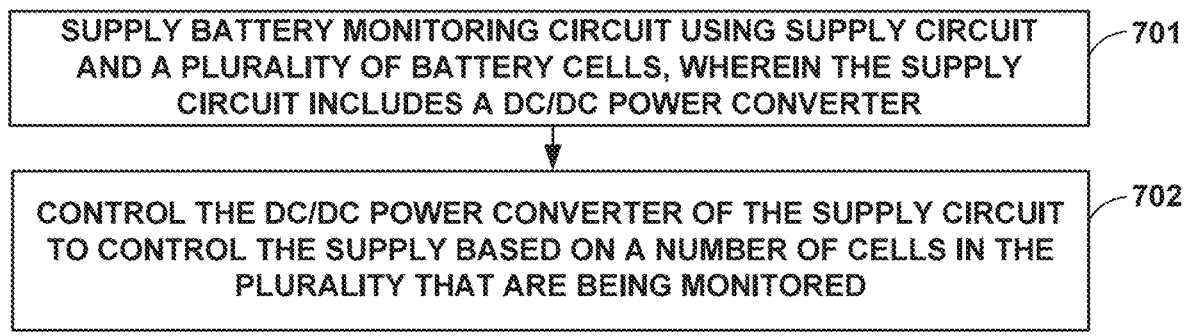
FIG. 7 is a flow diagram consistent with techniques of this disclosure.

FIG. 7 is a flow diagram consistent with techniques of this disclosure. As shown in FIG. 7, a method performed by a circuit may include supplying a battery monitoring circuit 106 using a supply circuit 102 and a plurality of battery cells 100 of a battery system, wherein the supply circuit 102 comprises a DC/DC power converter (701). The method may also include controlling the DC/DC power converter to control the supply based on a number of monitored battery cells in the plurality of battery cells (702), such as by controlling the DC/DC power converter according to a configurable parameter.

As described herein, the configurable parameter may comprise one or more K factors that configure the DC/DC power converter to define a ratio of input to output of the DC/DC power converter. The configurable parameter may be based on the number of monitored battery cells and based on a minimum number of battery cells that are being monitored within a BMS.

The method may also include individually coupling each of the battery cells 100 to a battery monitoring circuit 106 while supplying the battery monitoring circuit based on the plurality of cells. In some examples, the DC/DC power converter is configurable based on a first K factor that is based on the number of monitored battery cells and based on a minimum number of battery cells that are being monitored within the BMS, and based on a second K factor that is defined during production testing of the battery management circuit to tune the DC/DC power converter. The second K factor may compensate for operational changes of the battery management circuit caused by thermal variations.

In still other examples, the method shown in FIG. 7 may further include stimulating at least some of the plurality of cells while battery monitoring circuit 106 monitors the cells. Also, in some examples, the method shown in FIG. 7 may further include performing charge balancing of a block of battery cells relative to another block of battery cells using supply circuit 102.

The following clauses may illustrate one or more aspects of the disclosure.

Clause 1—A battery management circuit configured to monitor a plurality of battery cells, the battery management circuit comprising: a battery monitoring circuit; and a supply circuit configured to supply the battery monitoring circuit based on the plurality of battery cells, wherein the supply circuit comprises a DC/DC power converter and a regulator, and wherein the DC/DC power converter is configurable based on a number of monitored battery cells in the plurality of battery cells.

Clause 2—The battery management circuit of clause 1, wherein the DC/DC power converter is configurable to define a ratio of input to output of the DC/DC power converter.

Clause 3—The battery management circuit of clause 2, wherein the ratio is defined by a configurable parameter that is based on the number of monitored battery cells.

Clause 4—The battery management circuit of clause 3, wherein the configurable parameter is based on the number of monitored battery cells and based on a minimum number of battery cells that are being monitored within a battery management system (BMS).

Clause 5—The battery management circuit of any of clauses 1-4, further comprising one or more elements configured to individually couple each of the monitored battery cells to the battery monitoring circuit while supplying the battery monitoring circuit based on the plurality of cells.

Clause 6—The battery management circuit of any of clauses 1-5, wherein the DC/DC power converter is configurable based on a first K factor that is defined based on the number of monitored battery cells and defined based on a minimum number of battery cells that are being monitored by a BMS, and based on a second K factor that is defined during production testing of the battery management circuit to tune the DC/DC power converter.

Clause 7—The battery management system of clause 6, wherein the second K factor compensates for operational changes of the battery management circuit caused by thermal variations.

Clause 8—The battery management system of any of clauses 1-7, wherein the supply circuit is further configured to stimulate the plurality of cells while battery monitoring circuit monitors the cells.

Clause 9—The battery management system of any of clauses 1-8, wherein the supply circuit is further configured to perform charge balancing of the plurality of battery cells relative to one or more other sets of battery cells within a BMS.

Clause 10—A method comprising: supplying a battery monitoring circuit using a supply circuit and a plurality of battery cells of a battery system, wherein the supply circuit comprises a DC/DC power converter and a regulator, and controlling the DC/DC power converter according to a configurable parameter that is configurable based on a number of monitored battery cells in the plurality of battery cells.

Clause 11—The method of clause 10, wherein the configurable parameter configures the DC/DC power converter to define a ratio of input to output of the DC/DC power converter.

Clause 12—The method of clause 10 or 11, wherein the configurable parameter is based on the number of monitored battery cells and based on a minimum number of battery cells that are being monitored within a BMS.

Clause 13—The method of any of clauses 10-12, further comprising: individually coupling each of the battery cells to the battery monitoring circuit while supplying the battery monitoring circuit based on the plurality of cells.

Clause 14—The method of any of clauses 10-13, wherein the DC/DC power converter is configurable based on a first K factor that is based on the number of monitored battery cells and based on a minimum number of battery cells that are being monitored within a BMS, and based on a second K factor that is defined during production testing of the battery management circuit to tune the DC/DC power converter.

Clause 15—The method of clause 14, wherein the second K factor compensates for operational changes of the battery management circuit caused by thermal variations.

Clause 16—The method of any of clauses 10-15, further comprising: stimulating at least some of the plurality of cells while battery monitoring circuit monitors the cells.

Clause 17—The method of any of clauses 10-16, further comprising: performing charge balancing of the plurality of battery cells using the supply circuit, wherein the charge balancing is relative to one or more other sets of battery cells within a BMS.

Clause 18—A BMS configured to monitor a plurality of battery cells arranged in series, the BMS comprising: a first battery monitoring circuit configured to monitor a first subset of the plurality of battery cells; a second battery monitoring circuit configured to monitor a second subset of the plurality of battery cells, wherein the second subset is different than the first subset and wherein the second subset includes a different number of battery cells than the first subset; a first supply circuit configured to supply the first battery monitoring circuit based on the first subset of the plurality of battery cells; and a second supply circuit configured to supply the second battery monitoring circuit based on the second subset of the plurality of battery cells, wherein the first and second supply circuits are configured to define substantially similar supplies to the first battery monitoring circuit and to the second battery monitoring circuit.

Clause 19—The BMS of clause 18, wherein the first and second supply circuits each comprise a DC/DC power converter and a regulator, and wherein each of the DC/DC power converters is configurable based on a number of battery cells being monitored respectively by the first and second battery monitoring circuits.

Clause 20—The BMS of clause 18 or 19, wherein each of the DC/DC power converters is configurable to define a respective ratio of input to output, wherein for each of the DC/DC power converters, the respective ratio is defined by a configurable parameter that is based on the number of monitored battery cells and based on a minimum number of battery cells that are being monitored with the BMS.

Clause 21—The BMS of any of clauses 18-20, wherein the first supply circuit is configured to stimulate the first subset of the plurality of cells while first battery monitoring circuit monitors the first subset, and wherein the second supply circuit is configured to stimulate the second subset of the plurality of cells while second battery monitoring circuit monitors the second subset.

Clause 22—The BMS of any of clauses 18-21, wherein the first supply circuit is configured to perform charge balancing of the first subset of battery cells relative to the second subset of battery cells, and wherein the second supply circuit is configured to perform charge balancing of the second subset of battery cells relative to the first subset of battery cells.

Various aspects and examples have been described in this disclosure. These and other aspects and examples are within the scope of the following claims.

The invention claimed is:

1. A battery management circuit configured to monitor a plurality of battery cells, the battery management circuit comprising:
a battery monitoring circuit; and
a supply circuit configured to supply the battery monitoring circuit based on the plurality of battery cells, wherein the supply circuit comprises a DC/DC power converter and a regulator, and wherein the DC/DC power converter is configurable to define a ratio of input to output of the DC/DC power converter, wherein the ratio is based on both a number of monitored battery cells in the plurality of battery cells and on a minimum number of battery cells that are being monitored by other battery management circuits within a battery management system (BMS).

2. The battery management circuit of claim 1, further comprising one or more elements configured to individually couple each of the monitored battery cells to the battery monitoring circuit while supplying the battery monitoring circuit based on the plurality of battery cells.

3. The battery management circuit of claim 1, wherein the DC/DC power converter is configurable based on a first K factor that is defined based on the number of monitored battery cells and defined based on the minimum number of battery cells that are being monitored within the BMS, and based on a second K factor that is defined during production testing of the battery management circuit to tune the DC/DC power converter.

4. The battery management system of claim 3, wherein the second K factor compensates for operational changes of the battery management circuit caused by thermal variations.

5. The battery management system of claim 1, wherein the supply circuit is further configured to stimulate the plurality of battery cells while the battery monitoring circuit monitors the plurality of battery cells.

6. The battery management system of claim 1, wherein the supply circuit is further configured to perform charge balancing of the plurality of battery cells relative to one or more other sets of battery cells within the BMS.

7. A battery management system (BMS) configured to monitor a plurality of battery cells arranged in series, the BMS comprising:
a first battery monitoring circuit configured to monitor a first subset of the plurality of battery cells;
a second battery monitoring circuit configured to monitor a second subset of the plurality of battery cells, wherein the second subset is different than the first subset and wherein the second subset includes a different number of battery cells than the first subset;
a first supply circuit configured to supply the first battery monitoring circuit based on the first subset of the plurality of battery cells; and
a second supply circuit configured to supply the second battery monitoring circuit based on the second subset of the plurality of battery cells, wherein the first and second supply circuits are configured to define substantially similar supplies to the first battery monitoring circuit and to the second battery monitoring circuit,
wherein each of the first and second supply circuits comprises a DC/DC power converter and a regulator, and wherein each respective DC/DC power converter is configurable to define a ratio of input to output of the respective DC/DC power converter, wherein the ratio is based on both a number of monitored battery cells in the respective subset of the plurality of battery cells and on a minimum number of battery cells in another subset of the battery cells that are being monitored by another battery management circuit within the BMS.

8. A battery management circuit configured to monitor a plurality of battery cells, the battery management circuit comprising:
a battery monitoring circuit; and
a supply circuit configured to supply the battery monitoring circuit based on the plurality of battery cells, wherein the supply circuit comprises a DC/DC power converter and a regulator, and wherein the DC/DC power converter is configurable based on a number of monitored battery cells in the plurality of battery cells,
wherein the DC/DC power converter is configurable based on a first K factor that is defined based on the number of monitored battery cells and defined based on a minimum number of battery cells that are being monitored within a battery management system (BMS) and based on a second K factor that is defined during production testing of the battery management circuit to tune the DC/DC power converter.

9. The battery management system of claim 8, wherein the second K factor compensates for operational changes of the battery management circuit caused by thermal variations.

10. The battery management circuit of claim 8, further comprising one or more elements configured to individually couple each of the monitored battery cells to the battery monitoring circuit while supplying the battery monitoring circuit based on the plurality of battery cells.

11. The battery management system of claim 8, wherein the supply circuit is further configured to stimulate the plurality of battery cells while the battery monitoring circuit monitors the cells.

12. The battery management system of claim 8, wherein the supply circuit is further configured to perform charge balancing of the plurality of battery cells relative to one or more other sets of battery cells within the BMS.

* * * * *